(12) United States Patent
Jin et al.

(10) Patent No.: US 8,241,521 B2
(45) Date of Patent: Aug. 14, 2012

(54) LITHIUM IRON PHOSPHATE HAVING OXYGEN VACANCY AND DOPED IN THE POSITION OF FE AND METHOD OF QUICK SOLID PHASE SINTERING FOR THE SAME

(75) Inventors: Jiangjian Jin, Dongyang (CN); Guoguang Wang, Dongyang (CN); Jun Xu, Dongyang (CN); Daxin Bao, Dongyang (CN)

(73) Assignee: Hengdian Group DMEGC Magnetic Limited Company, Dongyang (CN)

( * ) Notice: Subject to any disclaimer, the term of this patent is extended or adjusted under 35 U.S.C. 154(b) by 226 days.

(21) Appl. No.: 12/622,397

(22) Filed: Nov. 19, 2009

(65) Prior Publication Data

US 2010/0171071 A1    Jul. 8, 2010

(30) Foreign Application Priority Data

Jan. 8, 2009  (CN) .......................... 2009 1 0095401

(51) Int. Cl.
*H01M 4/36*  (2006.01)
(52) U.S. Cl. ...................... 252/182.1; 252/500; 428/220
(58) Field of Classification Search ................. 252/500, 252/182.1; 428/220
See application file for complete search history.

(56) References Cited

U.S. PATENT DOCUMENTS

2004/0151649 A1* 8/2004 Hemmer et al. .............. 423/306
2005/0164084 A1* 7/2005 Adamson et al. ............. 429/220

FOREIGN PATENT DOCUMENTS

| CN | 1691380 A | 2/2005 |
| CN | 101279725 A | 8/2008 |
| EP | 2 207 229 A1 | 7/2010 |
| WO | WO 2006/066470 A1 | 6/2006 |

OTHER PUBLICATIONS

Hu et al., "Doping Effects on Electronic Conductivity and Electrochemical Performance of LiFePO$_4$", XP-002578272, J. Mater. Sci. Tech., vol. 25, No. 3, pp. 405-409, May 28, 2009.
Liu et al., "First-principle investigations of N doping in LiFePO$_4$", Solid State Communications, vol. 147, No. 11-12, pp. 505-509, XP023782737, LNKD-DOI:10.1016/J.SSC.2008.06.013, Sep. 1, 2008.
Communication under Rule 71(3) EPC, pp. 1-4, and Amended pages of text, 19 pages, and 2 sheets drawings (figs. 1-3), Aug. 6, 2011.

* cited by examiner

*Primary Examiner* — Mark Eashoo
*Assistant Examiner* — M. Reza Asdjodi
(74) *Attorney, Agent, or Firm* — Martine Penilla Group, LLP

(57) ABSTRACT

The present invention relates to a lithium ion cathode material lithium iron phosphate having oxygen vacancy and doped in the position of Fe and a preparation method of quick microwave sintering for the same. The molecular formula of the product in present invention is expressed as $LiFe_{1-x-a}Me_aM_xPO_{4-y}N_z$, wherein Me is one or more elements selected from Mg, Mn or Nd, and M is one or more elements selected from Li, Na, K, Ag or Cu; $0 \leq x \leq 0.1$, $0 < a \leq 0.1$, $0 < y \leq 0.5$, $0 \leq z \leq 0.5$, wherein x and z can not be 0 simultaneously. The quick micro-wave sintering preparation method in the present invention has advantages of high production efficiency, low energy consumption, good batch stability of the prepared product, excellent rate performance and cycle performance.

10 Claims, 2 Drawing Sheets

LITHIUM IRON PHOSPHATE HAVING OXYGEN VACANCY AND DOPED IN THE POSITION OF FE AND METHOD OF QUICK SOLID PHASE SINTERING FOR THE SAME

CLAIM OF PRIORITY TO RELATED APPLICATION

The present application is claiming priority Under 119 to Chinese Patent Application No. 200910095401.9, filed on Jan. 8, 2009, entitled, "LITHIUM IRON PHOSPHATE HAVING OXYGEN VACANCY AND DOPED IN THE POSITION OF FE AND THE PREPARATION METHOD OF QUICKLY SOLID PHASE SINTERING FOR THE SAME", the content of which is incorporated herein by reference.

TECHNICAL FIELD OF THE INVENTION

The present invention relates to a lithium-ion battery material and a preparation method of the same, especially to a lithium ion cathode material lithium iron phosphate having oxygen vacancy and doped in the position of Fe and a quick micro-wave sintering preparation method for the same.

BACKGROUND OF THE INVENTION

In recent years, with the rapid development of lithium-ion battery, the demand of a variety of portable electronic products and communication tools for lithium-ion battery increases gradually, and the large-scale dynamical lithium-ion power supply also develops rapidly. Cathode material is an important part of a lithium-ion battery, and the research on novel cathode material has become the key to determine the development of lithium-ion battery. At present, the large-scale commercial $LiCoO_2$ has the problems of comparatively large toxicity, high price and security issues. Although $LiNiO_2$ has lower cost and higher capacity, it is hard to be produced and has poor thermal stability and huge problem of security. Spinel $LiMn_2O_4$ has low cost and good security, but it has low capacity and poor cycle performance in elevated temperature. In order to satisfy the increased market demand, it is necessary to develop new low-price cathode material with excellent performance. The orthogonal olivine $LiFePO_4$ for new lithium-ion battery cathode material has high capacity and steady voltage of charge and discharge, and especially its low price, good security, good thermal stability and environmentally friendly property make it one of the most potential cathode material.

$LiFePO_4$ exists in the form of lithium iron phosphate mineral in nature. It belongs to orthorhombic system (D162h, Pmnb) and has an olivine orderly structure. There are four $LiFePO_4$ units in each crystal cell, wherein the cell parameters are expressed as follows: a=6.0089 Å, b=10.334 Å and c=4.693 Å. In $LiFePO_4$, the oxygen atoms are approximately hexagonal close packing (hcp), and the phosphorus atom locates in the interval of the tetrahedron, and iron atom and lithium atom locate in the interval of octahedron respectively. The octahedrons of $FeO_6$ connect in common points on the b-c plane of crystal. One octahedron of $FeO_6$ shares common edge with two octahedrons of $LiO_6$, while one tetrahedron of $PO_4$ shares common edge with one octahedron of $FeO_6$ and two octahedrons of $LiO_6$. $Li^+$ has two-dimensional mobility and it can get out and embed during the process of charge and discharge. The strong covalent bonds of P—O form three-dimensional chemical bonds of delocalization, so that $LiFePO_4$ has strong stability of thermodynamics and dynamics. Whereas, the pure phase of $LiFePO_4$ has the weakness of low electronic and ionic conductivity.

In addition, the price and the batch stability are two important factors in order to make lithium iron phosphate commercial available, which however haven't yet attracted sufficient attention currently. The current major methods for synthesizing lithium iron phosphate are the solid-state reaction method at high temperature, the liquid phase co-precipitation method, the hydro-thermal method, the liquid phase redox method, the solid phase micro-wave sintering method, the mechanical ball milling method and etc. The solid-state reaction method in high temperature is a widely used method at present, which using the ferrous iron salt as iron source, then mixing with lithium and phosphorus source, and then sintering in the inert atmosphere to synthesize lithium iron phosphate. However, the cost of the product is greatly increased due to the high price of ferrous iron source, and in order to avoid oxidation of ferrous iron source, the preparation process becomes more complex and it is hard to control the purity of the product. Furthermore, the general time of sintering is more than 6 hours when using this method to prepare lithium iron phosphate.

In order to solve the problem that pure phase $LiFePO_4$ has the weakness of low electronic and ionic conductivity, the researchers did a lot of research. Chinese patent CN100377392C discloses the lithium iron phosphate cathode material $LiFe_{1-x}M_xPO_{4-y}N_z$ having oxygen vacancy for the secondary lithium battery, wherein M is Li, Na, K, Ag, Cu. It uses N to replace O or uses the monovalent ion to replace Fe in $LiFePO_4$ to improve the electronic and ionic conductivity performance of $LiFePO_4$ to some extent. Chinese patent CN1328808C provides a nitrogen phosphate cathode material $Li_xA_aM_mB_bPO_zN_n$ for the secondary lithium battery, which has been improved the electronic and ionic conductivity of the material by doping in the single or double position of Li and/or M in $LiFePO_4$. Both CN100377392C and CN1328808C uses the solid phase sintering method in high temperature for the preparation of the material, which exists the problems of high energy consumption, long sintering time and instable performance of the product. Chinese patent application CN101279725A discloses a micro-wave quick solid phase sintering method of lithium ion battery cathode material lithium iron phosphate. It uses the ferric iron as iron source to solve the problem that ferrous iron is easy to be oxidized and causes impurity of the product. It also reduces the conventional reaction time of 6-30 h to 20-60 min, which improves the production efficiency, saves the energy consumption, reduces the cost of production, and improves the batch stability. The products prepared by this method have good electrode plate processability, conductivity and electrochemistry.

SUMMARY OF THE INVENTION

The object of the present invention is to provide a lithium iron phosphate having oxygen vacancy and doped in the position of Fe with the discharge performance at high rate, the molecular formula of which is $LiFe_{1-x-a}Me_aM_xPO_{4-y}N_z$, wherein Me is one or more elements selected from Mg, Mn and Nd, M is one or more elements selected from Li, Na, K, Ag and Cu; $0 \leq x \leq 0.1$, $0 \leq a \leq 0.1$, $0 \leq y \leq 0.5$, $0 \leq z \leq 0.5$, wherein x and z can not be 0 simultaneously.

The present invention also provides a quick solid phase sintering method for preparing the aforesaid lithium iron phosphate material having oxygen vacancy and doped in the position of Fe. This method has the advantages of high production efficiency, low energy consumption. The prepared product has good cycle performance, good batch stability, high tap density and excellent electrode processbility.

Introducing oxygen vacancy to a semiconductor will lead to the enhancement of the electronic conductivity in the material and exhibit n-type conductance. In lithium iron phosphate, lithium ions diffuse in the channel formed by tetrahedron of phosphate, which is affected by the interaction of oxygen. When oxygen vacancies exist, the coulomb force on the lithium ions is reduced, and the diffusion coefficient of lithium ions is increased. Because there are oxygen vacancies in the cathode material of the present invention, the electronic conductivity and the ionic conductivity of the material can be improved obviously. When used as cathode material in the battery, compared to the present system, the high-rate performance is more superior. The material's olivine structure can keep unchanged after introducing metal ions by doping in the position of Fe, which stabilizes the performance of stable cycle, improves electronic conductivity of lithium iron phosphate and the high-rate performance greatly. Compared to the lithium iron phosphate cathode material $LiFe_{1-x}M_xPO_{4-y}N_z$ disclosed in CN100377392C, the electronic conductivity and the ionic conductivity of the lithium iron phosphate material in the present invention improve effectively via further doping Mg, Mn or Nd in the position of Fe. Though CN1328808C discloses that two elements can be doped in the position of Fe, it only discloses generally the element types to choose. The inventor finds that if Me is one or more elements selected from Mg and Mn, and M is one or more elements selected from Li, Na, K, Ag and Cu, the performance of the resulting lithium iron phosphate material will be unexpectedly better, which is greatly more superior than that made by doping any other two elements in the position of Fe. The inventor believes that it may be due to the synergic effect between Me and M. The inventor also finds that when Me is rare earth element Nd, the rate performance of the resulting material is better than that when Me is Mg or Mn, the performance at high rate (5 C) will be more superior and the discharge capacity of the material can be more than 130 mAh/g.

There are no oxygen vacancies and doping elements in the lithium iron phosphate material prepared by the micro-wave solid phase sintering method disclosed in CN101279725A. A great improvement based on the aforesaid method is made by the present invention. The correlative process parameters are adjusted so that the method can be suitable to prepare the aforesaid lithium iron phosphate material having oxygen vacancy and doped in the position of Fe in the present invention. The inventor finds that it is feasible to use the micro-wave solid phase sintering method especially for the aforesaid lithium iron phosphate material having oxygen vacancy and doped in the position of Fe in the present invention. The low-price ferric iron source and one-step quick micro-wave solid phase sintering method are used to prepare lithium iron phosphate with excellent conductivity. Compared to other methods, the prepared products have good batch stability and cycle performance.

A quick solid phase sintering method of the present invention for the lithium iron phosphate material having oxygen vacancy and doped in the position of Fe comprises the following steps:
1. Preparing: mixing lithium compound, $Fe^{3+}$ compound, phosphate, dopant and additive in ratios, wherein the mol ratio of Li:Fe:Me:M:P is 1:(1−x):a:x:1. The added amount of the additive is 5-20%, preferably 10-15%, on basis of the total mass of the mixture;
2. Mixing: using agitator or sand mill as the device; Using de-ionized water, tap water or organic solvent like ethanol, coal oil and etc. as the solvent, the mixing time is 1-10 h, preferably 1-3 h; using oven or spray granulation device to dry the slurry after mixing, the drying temperature is 40-120° C., preferably 90-110° C. when using oven, the drying temperature is 140-360° C., preferably 270-320° C. when using spray granulating device;
3. Briquetting the mixture after drying: briquetting refers to using the press machine or the extruder to press the aforesaid mixture to be massive or honeycomb briquette or strip; or in stead of briquetting, putting the aforesaid mixture into the micro-wave reaction furnace, heating it under the protection of gaseous mixture of high-purity Ar and $H_2$, of which the flow rate is 0.01-50 L/min, the heating rate is 40-80° C./min, until heating to the temperature of 600-700° C. and keeping for 20-60 min, then cooling down to the room temperature; wherein the volume ratio of $H_2$ gas is 6-10% of the total volume, and the device selected for heating treatment is the micro-wave sintering furnace with industrial power of 1.5-5 KW.
4. Crushing treatment: using the secondary ball milling or the airflow milling and etc. to obtain uniformly distributed particles of lithium iron phosphate, in which the carbon content is 1~8 wt %.

The aforesaid step 1 can also comprises adding at least one nitrogen-containing compound selected from lithium nitride, urea or iron nitride to the mixture.

Preferably, the said lithium compound is at least one of lithium nitride, lithium fluoride, lithium carbonate, lithium oxalate, lithium acetate, lithium hydroxide monohydrate or lithium dihydrogen phosphate.

Preferably, the said $Fe^{3+}$ compound is one or more of iron red and ferric phosphate, and the main component of iron red is ferric oxide.

Preferably, the said phosphate is at least one of diammonium hydrogen phosphate, ammonium dihydrogen phosphate, triammonium phosphate or lithium dihydrogen phosphate.

Preferably, the said additive is at least one of carbon black, acetylene black, sucrose, starch, glucose, active carbon or polyvinyl alcohol.

Preferably, the said M-dopant is the fluoride, oxide or hydroxide of the metal M, and the said Me-dopant is the fluoride, oxide or hydroxide of the metal Me.

Preferably, the added solvent when mixing is de-ionized water, tap water, alcohol or coal oil.

The choice of the protection atmosphere in the step 3 is very important for preparing the lithium iron phosphate material having oxygen vacancy and doped in the position of Fe in the present invention. Thus, it is able to promote the reduction of $Fe^{3+}$ in the sintering process and avoid oxidation of the generated $Fe^{2+}$ to $Fe^{3+}$. In addition, a heat treatment of only 600-700° C. and 20-60 min is required to obtain lithium iron phosphate material having oxygen vacancy and doped in the position of Fe. Compared to the preparation of the un-doped lithium iron phosphate, the sintering temperature and time are reduced. Therefore, it is feasible to use the micro-wave quick solid phase sintering method especially for preparing the said lithium iron phosphate material having oxygen vacancy and doped in the position of Fe in the present invention.

The lithium iron phosphate material having oxygen vacancy and doped in the position of Fe obtained according to the method of the present invention is being tested, and its tap density generally can be more than 1.3 g/cm³; the material prepared by the method of the present invention has the advantages of high gram capacity, stable discharge plateau and excellent cycle performance.

The present invention has following advantages compared to the prior art:

(1) The electronic conductivity and the ionic conductivity of the prepared lithium iron phosphate having oxygen vacancy and doped in the position of Fe are improved greatly because of the synergic effect between Me element and M element in the position of Fe.
(2) The rate discharge performance of the prepared lithium iron phosphate having oxygen vacancy and doped in the position of Fe is especially excellent when the rare earth Nd and M element are doped in the position of Fe simultaneously.
(3) The micro-wave quick solid phase sintering method for preparing lithium iron phosphate having oxygen vacancy and doped in the position of Fe reduces the reaction temperature greatly, shortens the reaction time, improves the production efficiency greatly, and saves the energy consumption.
(4) Addition of the additive may achieve the molecular-level mixing with the mixture at high temperature, finally the additive coats around the lithium iron phosphate particles uniformly in the form of amorphous carbon, and the conductivity and the capacity of the material, the discharge performance and the cycle performance at high rate are improved. Too small added amount of carbon source might lead to poor material conductivity, while too much carbon source might lead to reduced tap density and reduced coating performance. Preferably, the excellent comprehensive performance may be achieved when carbon source content is 10%-15%. Furthermore, the additive is used to reduce $Fe^{3+}$ to $Fe^{2+}$. The newly produced $Fe^{2+}$ with high activity reacts with lithium and phosphorous source rapidly and combines stably to produce lithium iron phosphate with high purity.
(5) The prepared product has high tap density and excellent processbility of electrode, and meanwhile the prepared product has good batch stability and excellent cycle performance.

The cathode material provided by the present invention has an extensive application. The lithium battery prepared by the cathode material has good security performance and low cost, which can be used in the fields of electric bicycles, electric motorcycles, electric vehicles, miner's lamps, scooters, laptop computers, electric tools and some unconventional portable power source and so on.

DETAILED DESCRIPTION OF THE INVENTION

Following specific embodiments of the present invention give a further description of the technical character, but the present invention is not limited to these examples.

EXAMPLE 1

The Preparation of the Lithium Iron Phosphate Cathode Material $LiFe_{0.8}Mg_{0.1}Na_{0.1}PO_{3.95}$ of the Present Invention First, the lithium hydroxide monohydrate, ferric oxide, magnesium hydroxide, sodium fluoride and ammonium dihydrogen phosphate are weighed in the mol ratio of 1:0.8:0.1:0.1:1, and 12 wt % glucose is added on basis of weight of the mixture. Then the mixture is put into the sand mill to mix for 3.5 h, wherein the ratio of ball, mixture and water is 2:1:1. The mixed slurry is dried by a oven, briquetted by the continuous extruder, and then put into the micro-wave reaction furnace, heated to 650° C. with the rate of 50° C./min and kept for 45 min under the protection of the gas mixture comprising high-purity argon gas and hydrogen gas with the flow rate of 10 L/min(wherein the volume ratio of hydrogen gas is 8%), then cooled down to the room temperature. After crushed by using the crushing machine, the sintered material is stage-treated with the airflow mill. Then lithium iron phosphate is obtained in the form of even particles.

The carbon content of the material is detected as 5.6%.

The tap density of the material is detected as 1.4 g/cm$^3$. The prepared material is tested on the laser grain-size distribution meter, the measured particles of lithium iron phosphate are uniform and fine, the average grain diameter D50 is 1.12 µm, D10 is 0.43 µm, D90 is 2.92 µm, and the grain distribution is normal. SMD=0.89 µm and VMD=1.47 µm.

The cathode material obtained in example 1, acetylene black and PVDF are weighed in mass ratio of 82:8:10. The materials are made into electrodes after grinding uniformly. A battery is assembled with the metal lithium plate as anode, $LiPF_6$ is dissolved in the mixed solvent of ethyl carbonate and diethyl carbonate as electrolyte, wherein the concentration of $LiPF_6$ is 1.0 mol/L, the volume ratio of ethyl carbonate and diethyl carbonate is 1:1, and a polypropylene microporous thin film is used as the separator.

Figure 1:
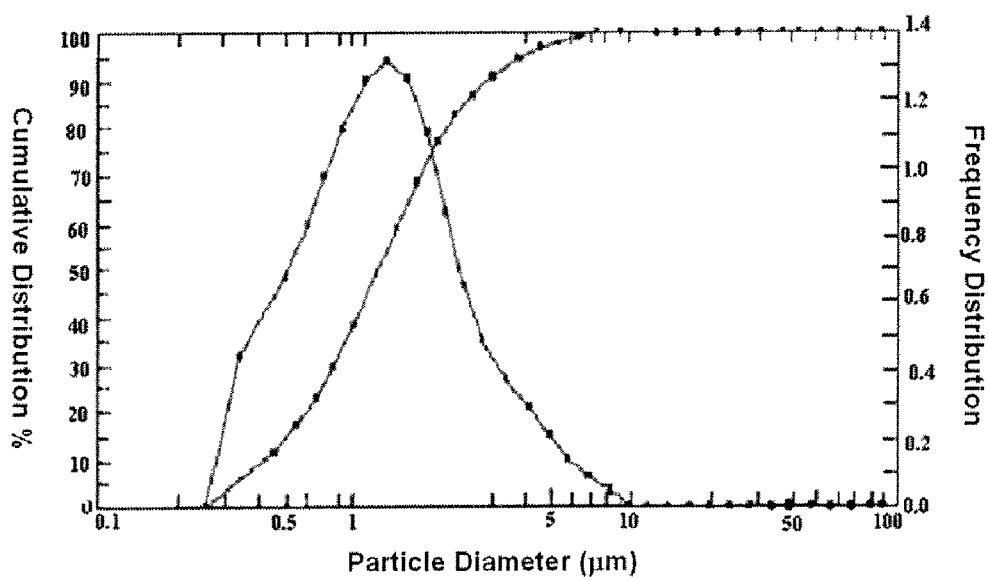
FIG. 1 shows the particle size distribution of the cathode material in example 1.
Figure 2:
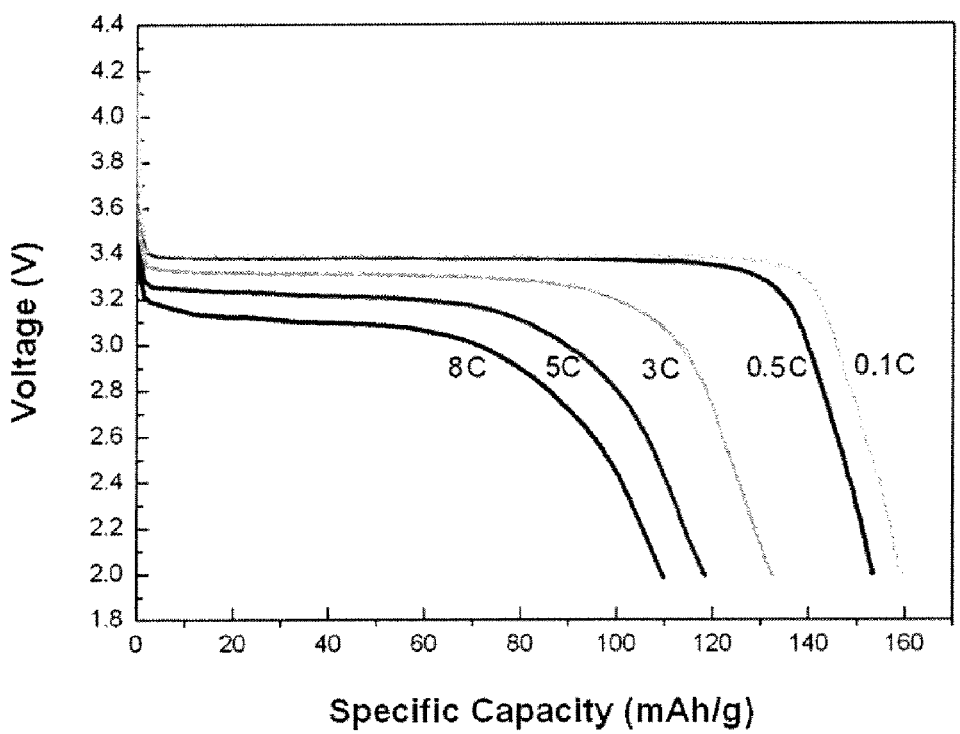
FIG. 2 shows the discharge curves of the simulated button cell prepared according to example 1, which is tested under the condition of different charge and discharge rate with the voltage range of 2.0-4.2V, the charge and discharge rates of 0.1 C, 0.5 C, 3 C, 5 C, 8 C respectively, and the testing temperature of 30° C.±1° C.

FIG. 2 shows the discharge curve under different charge and discharge rates. At 0.1 C discharge, the reversible gram capacity of the material can be as high as 160 mAh/g. At 0.5 C discharge, the reversible gram capacity is 153 mAh/g. At 3 C discharge, the reversible gram capacity is 134 mAh/g. At 5 C discharge, the reversible gram capacity is 120 mAh/g. At 8 C discharge, the reversible gram capacity is 110 mAh/g. The gram capacity is higher, the discharge plateau is more stable and the performance is more superior.

Figure 3:
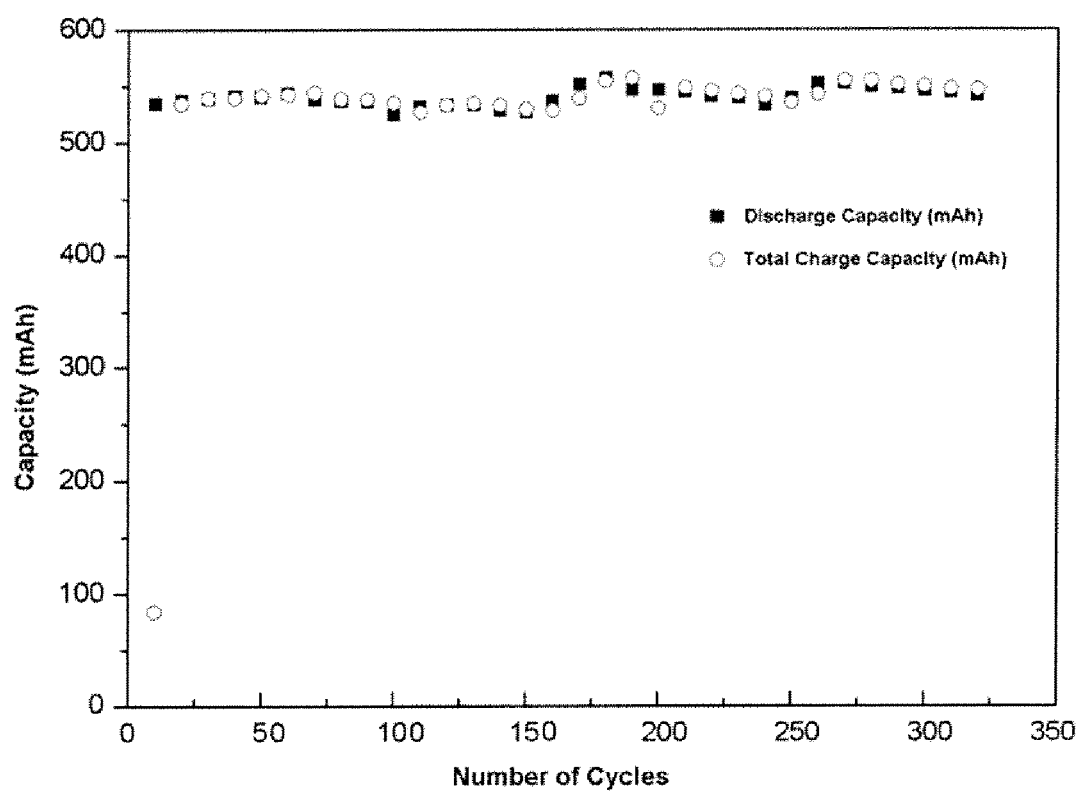
FIG. 3 shows the cycle performance curve of 17500 cylindrical lithium-ion battery prepared according to example 1, with the voltage range of 2.5-4.2V, the charge and discharge rates of 0.5 C, and the testing temperature of 30° C.±1° C.

The obtained materials are sent to a lithium-ion battery factory to process as the electrode plates, and then assembled to 17500 cylindrical batteries. FIG. 3 shows the measured cycle performance of the material under condition of 0.5 C charge-discharge rate. The maintain efficiency is more than 95% after 300 cycles.

EXAMPLE 2

The Preparation of the Lithium Iron Phosphate Cathode Material $LiFe_{0.98}Mn_{0.02}PO_{3.97}N_{0.02}$ Having Oxygen Vacancy of the Present Invention First, lithium hydroxide monohydrate, ferric oxide, manganese tetroxide, ammonium dihydrogen phosphate and lithium nitride are weighed in the mol ratio of 0.94:0.49:0.0067:1:0.02, and 10 wt % glucose of which the amount is added on basis of weight of the mixture. Then the mixture is put into the sand mill to mix for 3 h, wherein the ratio of ball, mixture and water is 2:1:1. The mixed slurry is spray dried with a spray drying tower, and then put into a micro-wave reaction furnace, heated to 630° C. at the rate of 50° C./min and kept for 45 min under the protection of gas mixture comprising high-purity argon gas and hydrogen gas with the flow rate of 10 L/min (the volume ratio of hydrogen gas is 6%), then cooled down to the room temperature. After crushed by using the crushing machine, the sintered material is stage-treated with an airflow mill. Then lithium iron phosphate is obtained in the form of even particles.

The carbon content of the material is detected as 4.2%.

The cathode material obtained in example 2, acetylene black and PVDF are weighed in the mass ratio of 85:5:10. The materials are made into electrodes after crushing uniformly. A battery is assembled with the metal lithium plate as anode, $LiPF_6$ is dissolved in the mixed solvent of ethyl carbonate and diethyl carbonate as electrolyte, wherein the concentration of $LiPF_6$ is 1.0 mol/L, and the volume ratio of ethyl carbonate and diethyl carbonate is 1:1, and a polypropylene microporous thin film is used as the separator.

The reversible gram capacity of the material can be as high as 155 mAh/g under the condition of 0.2 C discharge, while the reversible gram capacity is 144 mAh/g under the condition of 1 C discharge. The gram capacity is higher, the discharge plateau is more stable and the performance is more superior.

EXAMPLES 3-6 and COMPARATIVE EXAMPLES 1-3

The cathode material having the composition in table 1 for secondary lithium-ion battery is prepared by the method according to example 2 in the present invention, except that the required amounts of the corresponding dopant precursors are added into the precursors for the samples with the displacement of in the position of Fe and oxygen vacancies.

TABLE 1

Composition of cathode material and test result of model battery

| No. | Chemical formula of the cathode material | Discharge capacity(mAh/g) | | | capacity retention efficiency after 1000 cycles at 5 C (%) | tap density(g/cm³) |
|---|---|---|---|---|---|---|
| | | 0.2 C | 1 C | 5 C | | |
| Ex. 3 | $LiFe_{0.98}Nd_{0.01}K_{0.01}PO_{3.97}N_{0.02}$ | 153 | 143 | 130 | 98 | 1.32 |
| Ex. 4 | $LiFe_{0.98}Nd_{0.01}Na_{0.01}PO_{3.97}N_{0.02}$ | 152 | 140 | 131 | 98 | 1.34 |
| Ex. 5 | $LiFe_{0.97}Mn_{0.02}K_{0.02}PO_{3.94}N_{0.04}$ | 154 | 142 | 124 | 97 | 1.31 |
| Ex. 6 | $LiFe_{0.97}Mn_{0.02}Na_{0.02}PO_{3.94}N_{0.04}$ | 155 | 139 | 125 | 98 | 1.37 |
| Comp. 1 | $LiFe_{0.99}Na_{0.02}PO_{3.97}N_{0.02}$ | 151 | 141 | 122 | 92 | 1.27 |
| Comp. 2 | $LiFe_{0.98}Ag_{0.04}PO_{3.97}N_{0.02}$ | 150 | 137 | 120 | 89 | 1.30 |
| Comp. 3 | $LiFe_{0.96}Co_{0.02}Na_{0.02}PO_{3.94}N_{0.04}$ | 145 | 134 | 117 | 91 | 1.28 |

It can be seen from Table 1 that the cathode material of the present invention shows higher gram capacity and better rate performance, especially, when the cathode material is doped by Nd, and it has better discharge capacity of more than 130 mAh/g under the condition of high rate of 5 C. At the same time, the cycle performance of the material of the present invention is also excellent under the condition of high rate of 5 C. The capacity retention efficiency ratio still can be kept at about 98% after 1000 cycles. Furthermore, the material prepared by this method has high tap density and excellent processbility of electrode plate.

The specific examples described in the present invention only are illustration of the spirit of the present invention. The various modifications, supplements or similar substituents can be made in the described specific examples by the person skilled in the field. The present invention pertains to without departing form the spirit of the present invention and the scope of the appended claims.

Though the present invention has been illustrated in details by some mentioned specific examples, it is obvious to the person skilled in the art that the various modifications or amendments can be made without departing from the spirit of the present invention.

What is claimed is:

1. A lithium iron phosphate having oxygen vacancy and doped in the position of Fe, characterized in that, the molecular formula of the lithium iron phosphate is $LiFe_{1-x-a}Me_aM_xPO_{4-y}N_z$, wherein Me is one or more elements selected from Mg, Mn or Nd, and M is one or more elements selected from Li, Na, K, Ag or Cu; wherein $0 \leq x \leq 0.1$, $0 < a \leq 0.1$, $0 < y \leq 0.5$, $0 \leq z \leq 0.5$, where x and z can not be 0 simultaneously.

2. A lithium iron phosphate having oxygen vacancy and doped in the position of Fe according to claim 1, characterized in that, the molecular formula of the lithium iron phosphate is $LiFe_{1-x-a}Me_aM_xPO_{4-y}N_z$, wherein M is one or more elements selected from Li, Na, K or Cu.

3. A lithium iron phosphate having oxygen vacancy and doped in the position of Fe according to claim 2, characterized in that, the molecular formula of the lithium iron phosphate is $LiFe_{1-x-a}Me_aM_xPO_{4-y}N_z$, wherein $0 < z \leq 0.5$.

4. A lithium iron phosphate having oxygen vacancy and doped in the position of Fe according to claim 2, characterized in that, the molecular formula of the lithium iron phosphate is $LiFe_{1-x-a}Me_aM_xPO_{4-y}N_z$, wherein Me is Mn or Nd.

5. A lithium iron phosphate having oxygen vacancy and doped in the position of Fe according to claim 2, characterized in that, the molecular formula of the lithium iron phosphate is $LiFe_{1-x-a}Me_aM_xPO_{4-y}N_z$, wherein Me is Nd.

6. A lithium iron phosphate having oxygen vacancy and doped in the position of Fe according to claim 5, characterized in that, the lithium iron phosphate is $LiFe_{0.98}Nd_{0.01}K_{0.01}PO_{3.97}N_{0.02}$ or $LiFe_{0.98}Nd_{0.01}Na_{0.01}PO_{3.97}N_{0.02}$.

7. A lithium iron phosphate having oxygen vacancy and doped in the position of Fe according to claim 1, characterized in that, the molecular formula of the lithium iron phosphate is $LiFe_{1-x-a}Me_aM_xPO_{4-y}N_z$, wherein $0 < z \leq 0.5$.

8. A lithium iron phosphate having oxygen vacancy and doped in the position of Fe according to claim 1, characterized in that, the molecular formula of the lithium iron phosphate is $LiFe_{1-x-a}Me_aM_xPO_{4-y}N_z$, wherein Me is Mn or Nd.

9. A lithium iron phosphate having oxygen vacancy and doped in the position of Fe according to claim 1, characterized in that, the molecular formula of the lithium iron phosphate is $LiFe_{1-x-a}Me_aM_xPO_{4-y}N_z$ wherein Me is Nd.

10. A lithium iron phosphate having oxygen vacancy and doped in the position of Fe according to claim 9, characterized in that, the lithium iron phosphate is $LiFe_{0.98}Nd_{0.01}K_{0.01}PO_{3.97}N_{0.02}$ or $LiFe_{0.98}Nd_{0.01}Na_{0.01}PO_{3.97}N_{0.02}$.

* * * * *